US006901599B2

(12) United States Patent
Nagatsuka

(10) Patent No.: US 6,901,599 B2
(45) Date of Patent: May 31, 2005

(54) OPTICAL-PICKUP FEEDING DEVICE, AND OPTICAL-DISK APPARATUS MOUNTING THE DEVICE

(75) Inventor: Osamu Nagatsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/315,027

(22) Filed: Dec. 10, 2002

(65) Prior Publication Data

US 2003/0133397 A1 Jul. 17, 2003

(30) Foreign Application Priority Data

Jan. 16, 2002 (JP) ........................................ 2002-007669

(51) Int. Cl.[7] ............................................. G11B 7/085
(52) U.S. Cl. ...................................................... 720/675
(58) Field of Search ................................ 720/675, 676; 369/223, 219.1, 215.1

(56) References Cited

U.S. PATENT DOCUMENTS

| | | | | |
|---|---|---|---|---|
| 5,488,526 A | * | 1/1996 | Sakashita et al. | ........ 360/267.3 |
| 6,052,358 A | * | 4/2000 | Morikawa et al. | .......... 369/219 |
| 6,219,326 B1 | * | 4/2001 | Yamashita et al. | .......... 369/223 |
| 6,335,915 B1 | * | 1/2002 | Uchiyama et al. | .......... 369/223 |
| 6,411,596 B1 | | 6/2002 | Nagatsuka | .................. 369/291 |

FOREIGN PATENT DOCUMENTS

| | | | |
|---|---|---|---|
| JP | 60-2196920 | * | 11/1985 |
| JP | 2000-11386 | | 1/2000 |
| JP | 2000-339888 | | 12/2000 |

* cited by examiner

*Primary Examiner*—Allen Cao
(74) *Attorney, Agent, or Firm*—Fitzpatrick, Cella, Harper & Scinto

(57) ABSTRACT

An optical-pickup feeding device includes a chassis, a guide shaft supported on the chassis, a feeding motor on a main shaft of which a lead screw is formed, a connecting member fitted in the lead screw, a frame, mounted on the chassis, for supporting the feeding motor, and an optical pickup. The connecting member is fixed on one side of the optical pickup, and another side of the optical pickup is anchored on the guide shaft. The optical pickup is driven in a direction parallel to the guide shaft and the lead screw by the feeding motor via the connecting member. The device also includes a meshing feed member, fixed to the optical pickup or the connecting member, having a tooth in mesh engagement with a screw portion of the lead screw.

6 Claims, 5 Drawing Sheets

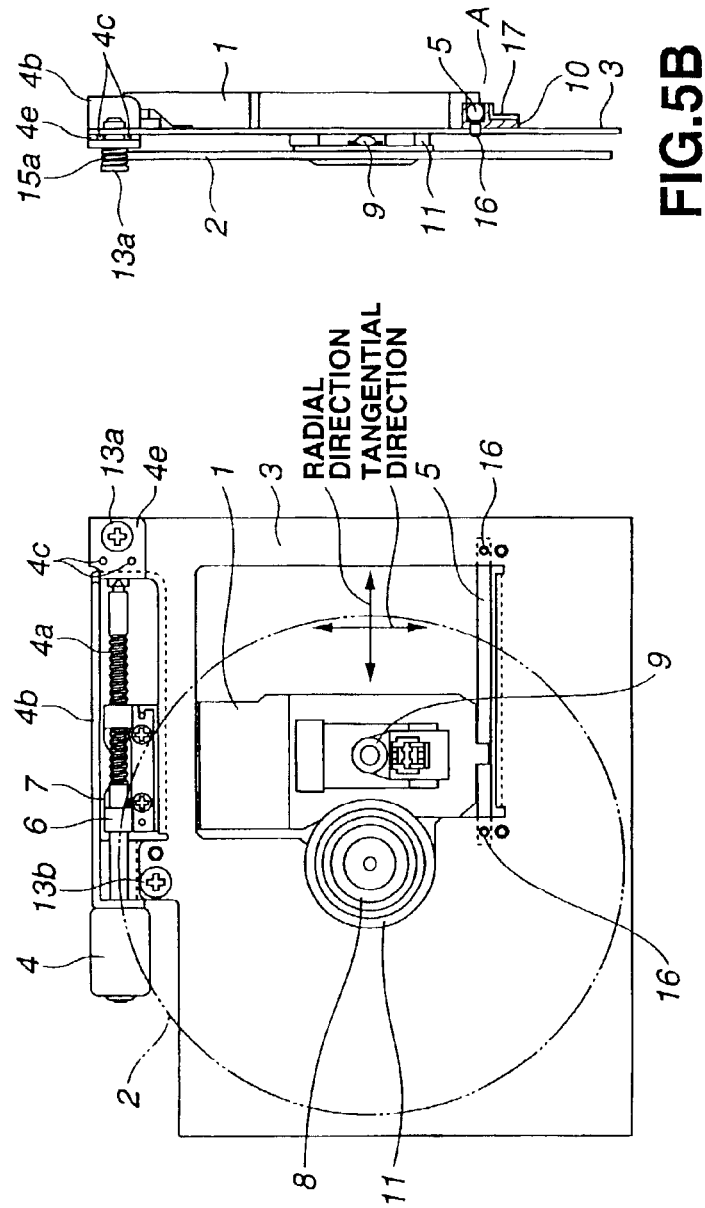
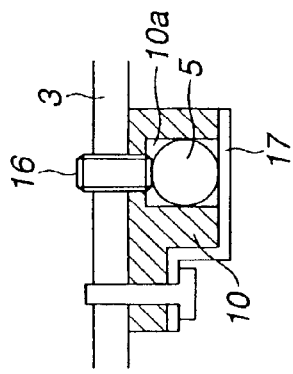
FIG.5A FIG.5B FIG.5C

OPTICAL-PICKUP FEEDING DEVICE, AND OPTICAL-DISK APPARATUS MOUNTING THE DEVICE

BACKGROUND OF THE INVENTION

1. Field of the Invention

The present invention relates to an optical-pickup feeding device used in an optical-disk apparatus for recording and reproducing information on a recording medium, such as a magneto-optical disk or an optical disk (hereinafter generically termed an "optical disk").

2. Description of the Related Art

FIG. 8 is a plan view illustrating a conventional optical-pickup feeding device 20, and FIG. 9 is a cross-sectional view illustrating a principal portion of the device shown in FIG. 8. As shown in FIGS. 8 and 9, the conventional optical-pickup feeding device 20 generally adopts a lead screw mechanism as means for feeding an optical pickup 21 in the radial direction, i.e., in the horizontal direction in FIG. 8, of an optical disk 22.

That is, the optical-pickup feeding device 20 uses a feeding motor 24 (such as a stepping motor or a DC motor) fixed on a chassis 23, which serves as a substrate for assembly, as a driving source. A motor gear 28 fixed on the rotation shaft of the feeding motor 24 is connected to a driving gear 26 fixed on a driving guide shaft 25, via intermediate gears 27A and 27B.

In a typical conventional optical-pickup feeding device, in order to feed the optical pickup 21, three shafts, i.e., the driving guide shaft 25, a sub-guide shaft 29, and another sub-guide shaft, are used. In the device shown in FIG. 8, however, only two shafts, i.e., the driving guide shaft 25 and the sub-guide shaft 29, are used. End portions of these shafts are supported by guide-shaft supporting members 30a, 30b and 30c. This configuration is frequently used to support the optical pickup 21 is in optical-pickup feeding devices for MD's (mini-discs).

In the optical-pickup feeding device 20 shown in FIG. 8, a rack plate 31 for converting rotational movement into linear movement by meshed engagement with the driving guide shaft 25 is fixed on an end portion of the optical pickup 21. Accordingly, the optical pickup 21 is driven to a predetermined position in a radial direction in accordance with the angle of rotation of the driving guide shaft 25.

For example, when performing a reproducing operation, the optical disk 22 is driven by a spindle motor 32 at a predetermined revolution speed. At the same time, the optical pickup 21 is intermittently fed in a radial direction of the optical disk 22 by the feeding motor 24, that is, in a direction from the radial inside to the radial outside of the optical disk 22, while reading information written on tracks of the optical disk 22 by the optical pickup 21.

As shown in FIG. 9, when recording/reproducing information on/from the optical disk 22 mounted on a turntable 33, an objective lens 34 of the optical pickup 21 moves in tracking directions indicated by a two-headed arrow A and focusing directions indicated by a two-headed arrow B with respect to the optical disk 22, and a laser beam condensed on the objective lens 34 is incident upon and reflected from the substrate of the optical disk 22 at a predetermined tilt angle.

Accordingly, a gap L, shown in FIG. 9, between the objective lens 34 mounted in the optical pickup 21 and the surface of the substrate of the optical disk 22 must be within a predetermined tolerance throughout the operating range from the inner circumference to the outer circumference of the optical disk 22. The driving guide shaft 25 and the sub-guide shaft 29 guiding the optical pickup 21 are arranged parallel to each other and spread apart at a predetermined distance, and also are arranged parallel to the surface of the substrate of the optical disk 22.

In accordance with recent trends toward higher density in optical disks, the wavelength of laser light for recording and reproducing operations is becoming shorter, and a tolerance for error of the tilt angle of the laser beam is becoming more critical. As a result, higher accuracy is requested for the flatness of a chassis of a disk driving mechanism, accuracy in the relative vertical disposition of the shaft of a motor, and mounting of a guide shaft.

In order to solve such problems, tilt-adjusting optical-pickup feeding devices have been proposed. For example, as a method for adjusting the tilt angle by inclining a guide shaft, Japanese Patent Application Laid-Open (Kokai) No. 2000-11386 (2000) discloses a configuration in which both ends of a pair of guide shafts are supported by supporting members so as to be able to incline in a radial direction of the optical disk, and the guide shafts can be raised/lowered by elastically deforming a chassis on which the supporting members are provided.

However, such a configuration for supporting guide shafts requires a deceleration mechanism between a driving guide shaft and a motor, resulting in an increase in the number of components, higher production costs, and an increase in the occupied space, thereby causing impediments to reducing the size of the apparatus. Furthermore, since components of the deceleration mechanism cause increased variations in the load of the motor, the rating of the motor must be selected taking into consideration safety factors due to these variations.

In consideration of recent trends in feeding motors toward a smaller size and a higher torque, Japanese Patent Application Laid-Open (Kokai) No. 2000-339888 (2000) has proposed a method of directly driving an optical pickup, in which a lead screw is integrally formed on the rotation shaft of a motor, thereby omitting a conventional deceleration mechanism comprising a plurality of gears.

In this driving method, an optical pickup is supported by two guide shafts, and a motor including a lead screw is provided outside of the guide shafts. By adopting such a configuration, a lower cost is realized by omitting a deceleration mechanism comprising a plurality of gears and the like.

In such a driving method adopting a direct drive motor, although the tilt angle can be adjusted by the conventional approach of adjusting the inclination and the height of the guide shafts, two guide shafts are required. Since a lead screw and a motor are provided outside of the guide shafts, the external size of the optical-pickup feeding device increases, creating an impediment to reducing the size of the apparatus.

A configuration may also be adopted in which a direct drive motor integrated with a lead screw is adopted in the above-described configuration, in which the lead screw also operates as one of the guide shafts, as in the above-described MD type. However, since the conventional tilt adjusting method is devised for guide shafts that do not rotate, an appropriate tilt adjusting mechanism has not been devised in the above-described configuration. Furthermore, the above-described configuration is not conducive to assembling components.

SUMMARY OF THE INVENTION

The present invention has been made in consideration of the above-described problems.

It is an object of the present invention to provide an optical-pickup feeding device that can be easily assembled.

It is another object of the present invention to provide an inexpensive and small-size optical-pickup feeding device in which correction of inclination can be performed using a simple configuration.

According to one aspect of the present invention, an optical-pickup feeding device includes a chassis, a guide shaft supported on the chassis, a feeding motor including a main shaft having a lead screw formed thereon, a connecting member fitted on the lead screw, a frame, mounted on the chassis, for supporting the feeding motor, and an optical pickup. The connecting member is fixed on one side of the optical pickup, and another side of the optical pickup is anchored on the guide shaft. The optical pickup is driven in a direction parallel to the guide shaft and the lead screw by the feeding motor via the connecting member. The device also includes a meshing feed member, fixed to the optical pickup or the connecting member having teeth in meshed engagement with a screw portion of the lead screw.

According to another aspect of the present invention, an optical disk apparatus includes an optical pickup, and the above-described optical-pickup feeding device.

The foregoing and other objects, advantages and features of the present invention will become more apparent from the following description of the preferred embodiments taken in conjunction with the accompanying drawings.

BRIEF DESCRIPTION OF THE DRAWINGS

FIGS. 5A–5C illustrate an optical-pickup feeding device according to a third embodiment of the present invention: FIG. 5A is a plan view; FIG. 5B is a side view, as seen from the right side of the FIG. 5A; and FIG. 5C is an enlarged view of a portion A shown in FIG. 5B;

DETAILED DESCRIPTION OF THE PREFERRED EMBODIMENTS

Preferred embodiments of the present invention will now be described in detail with reference to the drawings.

Figure 1:
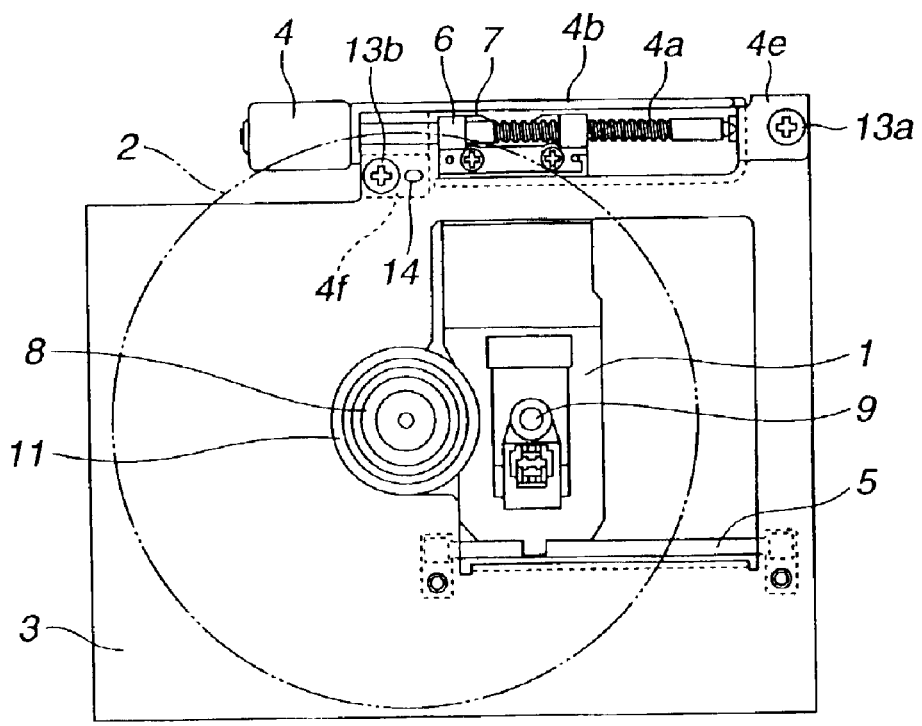
FIG. 1 is a plan view illustrating an optical-pickup feeding device according to a first embodiment of the present invention.
Figure 2:
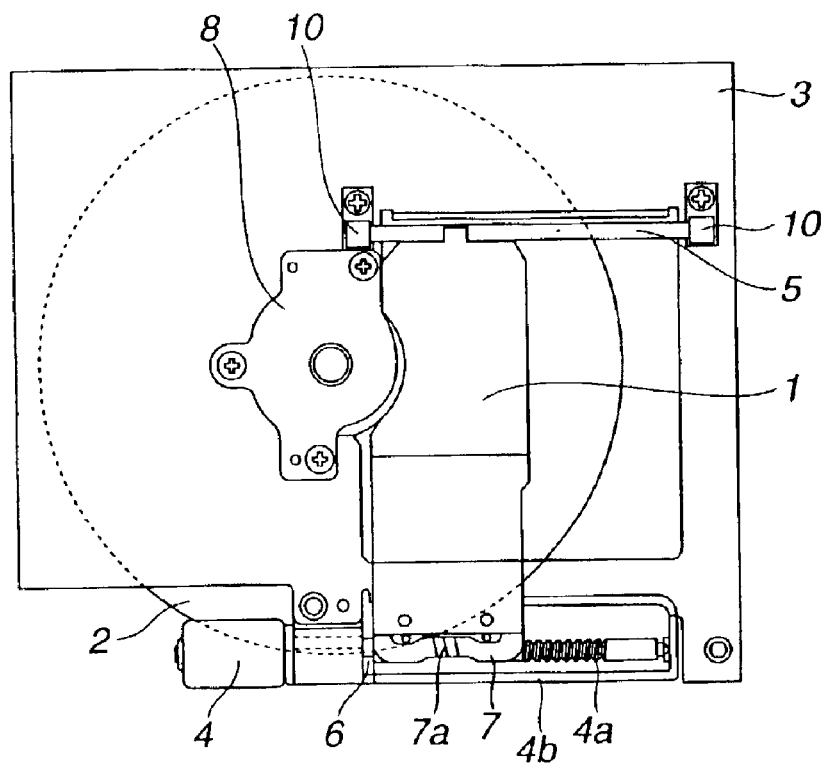
FIG. 2 is a plan view illustrating the optical-pickup feeding device shown in FIG. 1, as seen from the back of the device.
Figure 3:
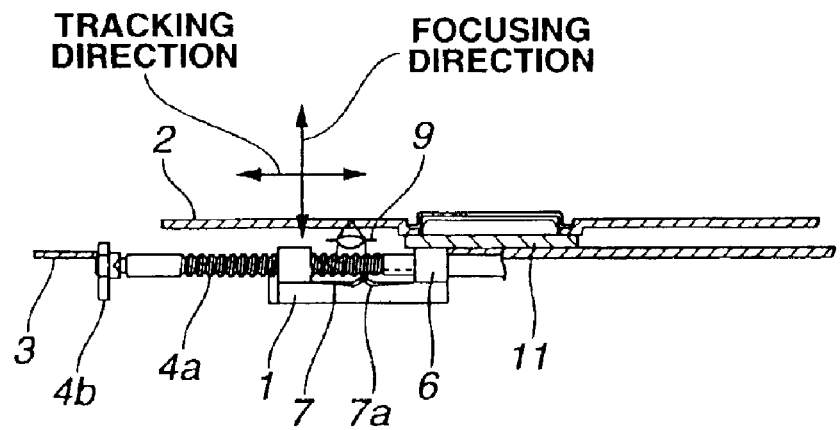
FIG. 3 is a cross-sectional view illustrating an optical-pickup driving portion of the optical-pickup feeding device shown in FIGS. 1 and 2.

FIG. 1 is a plan view illustrating an optical-pickup feeding device according to a first embodiment of the present invention. FIG. 2 is a plan view of the optical-pickup feeding device shown in FIG. 1, as seen from the back of the device. FIG. 3 is a cross-sectional view illustrating a pickup driving portion of the optical-pickup feeding device shown in FIGS. 1 and 2.

In FIGS. 1–3, there are shown a rectangular optical pickup 1, an optical disk 2, a chassis 3, a feeding motor 4, a lead screw 4a formed on the main shaft of the feeding motor 4, and a frame 4b that is bent substantially in the form of U (U-shaped frame). Bent portions (flanges) 4e and 4f at respective ends of the frame 4b are fixed to the chassis 3 via adjusting shoulder screws 13a and 13b, respectively. The frame 4b supports a fixed frame of the feeding motor 4 and an end of the axis of the lead screw 4a.

A guide shaft 5 is provided in parallel arrangement with the lead screw 4a via a pair of supporting members 10 on the back of the chassis 3. Holes for receiving the lead screw 4a are formed at respective wall portions of a substantially convex connecting member 6, that is connected to one end of the optical pickup 1. These components are assembled by first fixing the lead screw 4a on the frame 4b in a state in which the connecting member 6 is fitted on the lead screw 4a, and then fixing the connecting member 6 and the optical pickup 1 using a screw. According to such a configuration, in a structure in which a direct drive motor having a lead screw is adopted, connection of the lead screw and the optical pickup can be easily and very precisely performed. A meshing feed member 7 is fitted between the connecting member 6 and an end portion of the optical pickup 1. The connecting member 6 and the meshing feed member 7 are fixed to the optical pickup 1 using a pair of fastening members.

A tooth portion 7a protrudes at a central portion of the meshing feed member 7. A spindle motor 8 is fixed on the chassis 3. There are also shown an objective lens 9, and a turntable 11 (shown in FIG. 3) for the spindle motor 8.

In the optical-pickup feeding device having the above-described configuration, the optical pickup 1 is driven by the feeding motor 4 fixed on the frame 4b that is fixed at an end portion of the chassis 3, and is guided by two shafts, i.e., the lead screw 4a and the guide shaft 5.

Both end portions of the substantially concave connecting member 6 are fitted on the lead screw 4a. The meshing feed member 7 comprises a thin metal plate operating as a spring. The tooth portion 7a is provided with an inclination that is the same as the lead angle of the lead screw 4a at a central portion of the meshing feed member for 7, e.g., by V-shaped bending. The tooth portion 7a is pressed against the lead screw 4a by the elastic force of the metal plate.

As a result of this pressing force, a meshed portion between the tooth portion 7a and the lead screw 4a accurately feeds the optical pickup 1 without producing backlash during forward/reverse rotation of the lead screw 4a.

The meshing feed member 7 is captured/grasped between the connecting member 6 and the optical pickup 1, and is fastened together with the connecting member 6. Since the distance between the meshing feed member 7 and the lead screw 4a is maintained at a constant value, the pressing force of the tooth portion 7a is constant, so that a stable meshed state is maintained, and the meshing feed member 7 moves the optical pickup 1 to a predetermined position in a radial direction of the optical disk 2 in accordance with the angle of rotation of the lead screw 4a.

In this optical-pickup feeding device, during a reproducing operation of the optical disk 2, the optical disk 2 is driven at a predetermined revolution speed by the spindle motor 8, and the optical pickup 1 is intermittently fed in a radial direction of the optical disk 2 by the feeding motor 4, so that the optical pickup 1 can move by performing tracking from the radial inside to the radial outside of the optical disk 2 while reading information written in tracks of the optical disk 2.

When assembling this optical-pickup feeding device, first, the frame 4b supporting the feeding motor 4 is attached by screws to the optical pickup 1, together with the meshing feed member 7 via the connecting member 6, to provide a unit.

The spindle motor 8 and the guide shaft 5 are mounted in advance on the back of the chassis 3. After anchoring an anchoring portion provided at an end portion of the optical pickup 1 assembled in the unit to the guide shaft 5, both ends of the frame 4b are assembled on the chassis 3 via shoulder screws 13a and 13b.

In an optical-pickup feeding device having the above-described configuration, since the lead screw 4a on the main shaft of the feeding motor 4 supported by the frame 4b also operates as a driving guiding shaft for the optical pickup 1, the number of components of the optical-pickup driving portion is decreased, thereby mitigating and stabilizing the load of the feeding motor 4. Accordingly, by simply controlling the performance of the feeding motor 4, it is possible to suppress variations in the load of the optical-pickup feeding device. Hence, quality control can be easily performed.

Furthermore, since the meshing feed member 7 is captured/grasped between the optical pick-up 1 and the connecting member 6, no particular space for mounting the meshing feed member 7 on the optical pickup 1 is necessary, and therefore the number of assembling processes is reduced, and reduction in the production cost can be realized.

Furthermore, since the optical pickup and the connecting member are separately provided, in contrast to the conventional approach in which these components are integrally formed, materials adapted to the desired characteristics of the respective components can be selected. Hence, the degree of freedom in design increases. Since the connecting member and the lead screw are assembled by fitting the lead screw in holes provided in respective wall portions of the connecting member, these components can be precisely positioned by improving accuracy in processing of the holes. In addition, it is possible to reduce the number of components, such as the driving mechanism, the guide-shaft supporting unit and the like, and the number of assembling processes, thereby reducing the production cost, and the driving mechanism is configured only by the feeding motor by omitting the deceleration mechanism. Hence, it is possible to reduce the size and the weight of the device.

Although in the first embodiment, a case has been illustrated in which the meshing feed member 7 is configured with a thin metal plate operating as a spring, the meshing feed member 7 may be made of a resin, a resin and a metal plate, or a composite member made of a resin and a metal plate.

Figure 4:
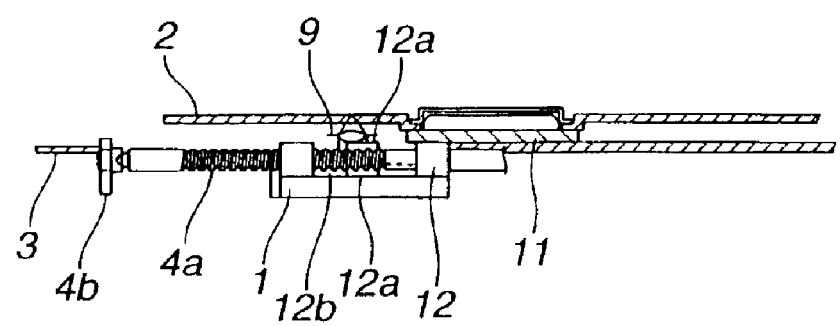
FIG. 4 is a cross-sectional view illustrating an optical-pickup driving portion of an optical-pickup feeding device according to a second embodiment of the present invention.

FIG. 4 is a cross-sectional view illustrating a principal portion of an optical-pickup feeding device according to a second embodiment of the present invention, corresponding to FIG. 3 in the first embodiment. The configuration of the second embodiment differs from that of the first embodiment in that the connecting member 6 and the meshing feed member 7 are integrally formed, and are made of a resin. Accordingly, the same components as those shown in FIG. 3 are indicated by the same reference numerals, and further description thereof will be omitted.

That is, in FIG. 4, a connecting member 12 corresponds to the connecting member 6 in the first embodiment. For example, the connecting member 12 is made of sliding-grade polyacetal. A tooth portion 12a of the connecting member 12 is formed at a central base portion 12b and arranged in mesh contact with lead screw 4a. The tooth portion 12a is pressed against the lead screw 4a by the elastic force of the resin, and very precisely feeds an optical pickup 1 by preventing backlash between the lead screw 4a and the optical pickup 1, as in the first embodiment.

In the second embodiment, since the number of components is smaller than in the first embodiment, the number of assembling processes is reduced, and it is possible to reduce the production cost of the optical-pickup feeding device. In addition, since the tooth portion 12a is made of resin, noise generated by sliding contact with the lead screw 4a can be reduced.

Although in the second embodiment the tooth portion 12a is pressed against the lead screw 4a only by the elastic force of the resin, an auxiliary thin metal plate operating as a spring may also be used, in order to further improve the reliability of the pressing force over a long period of time.

Figure 6:
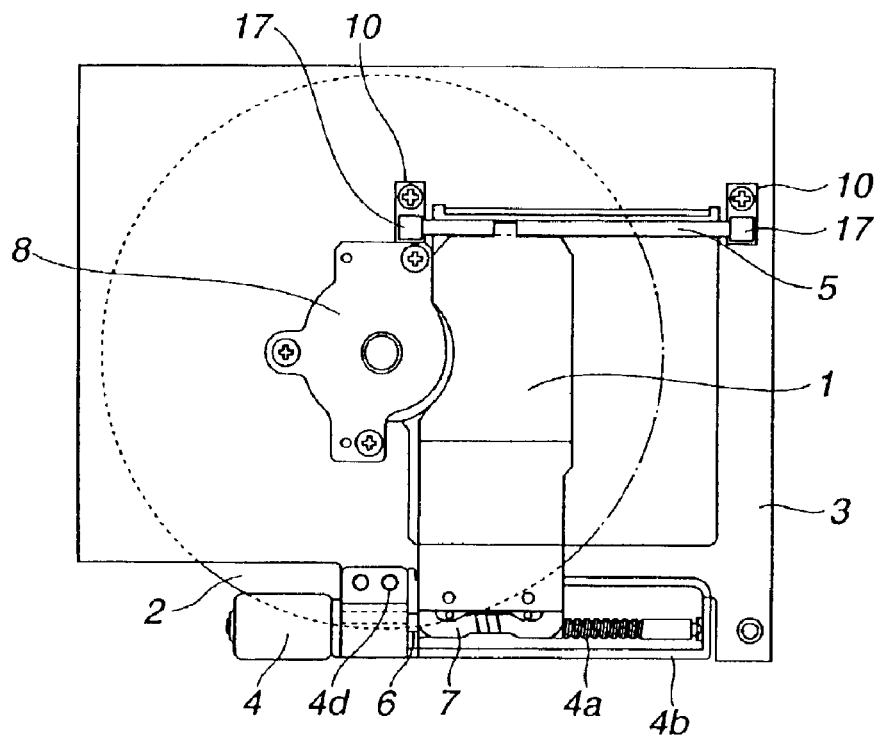
FIG. 6 is a plan view of the optical-pickup feeding device shown in FIG. 5A, as seen from the back of the device.
Figure 7A:
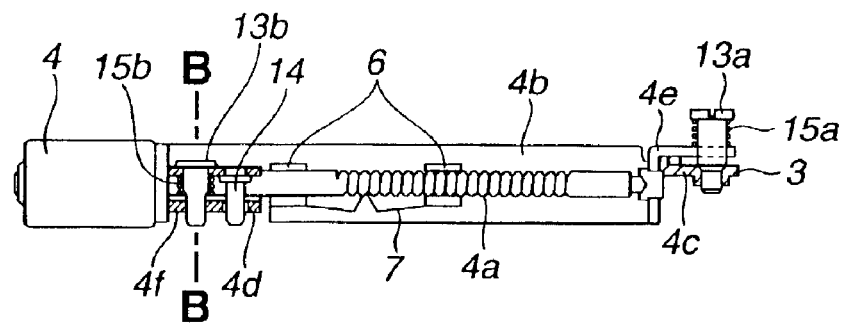
FIG. 7A is a cross-sectional view illustrating a tilt-angle adjusting mechanism of the optical-pickup feeding device shown in FIGS. 5A–5C.
Figure 7B:
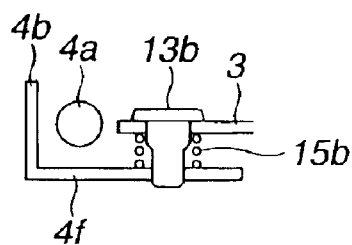
FIG. 7B is a cross-sectional view of a portion B shown in FIG. 7A.
Figure 8:
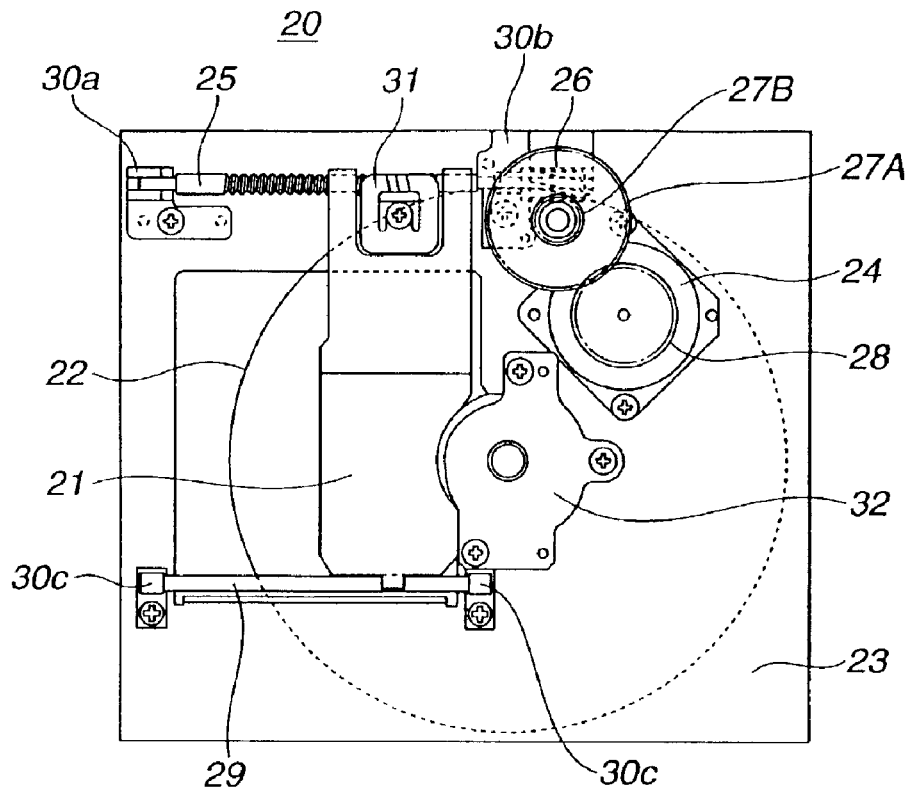
FIG. 8 is a plan view illustrating a conventional optical-pickup feeding device.
Figure 9:
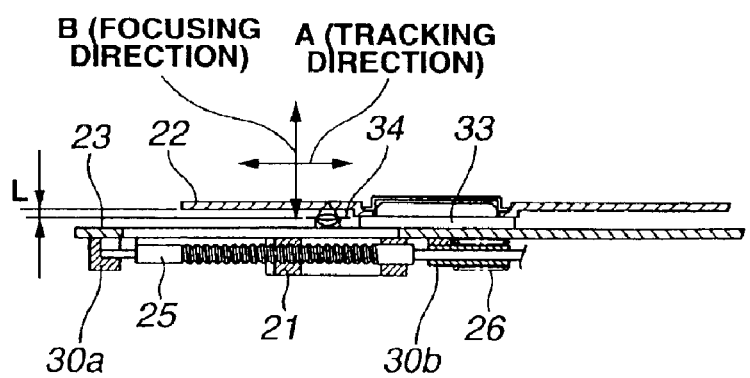
FIG. 9 is a cross-sectional view illustrating an optical-pickup driving portion of the optical-pickup feeding device shown in FIG. 8.

FIGS. 5A–5C illustrate an optical-pickup feeding device according to a third embodiment of the present invention. FIG. 5A is a plan view corresponding to FIG. 1. FIG. 5B is a side view, as seen from the right side of the FIG. 5A. FIG. 5C is an enlarged view of a portion A shown in FIG. 5B. FIG. 6 is a plan view of the optical-pickup feeding device shown in FIG. 5A, as seen from the back of the device. FIG. 7A is a cross-sectional view illustrating a tilt-angle adjusting mechanism of the optical-pickup feeding device shown in FIGS. 5A–5C. FIG. 7B is a cross-sectional view of a portion B shown in FIG. 7A. In FIGS. 5A–5C, 6, 7A and 7B, the same components as those in the first and second embodiments are indicated by the same reference numerals, and further description thereof will be omitted.

In FIGS. 5A–5C, 6, 7A and 7B, a pair of projections 4 whose distal ends are semispherical extend vertically from a lower surface of an upper end portion of a right-side bent portion 4e of a frame 4b. A guide hole 4d shown in FIGS. 6 and 7A that extends in a radial direction shown in FIG. 5A is formed in a lower left bent portion 4f of the frame 4b.

A groove 10a shown in FIG. 5C, whose lower end is open, is formed in a radial direction of a guide-shaft supporting member 10 provided at the back of a chassis 3. Height adjusting screws 16, each having a hexagonal hole or a slot formed on the head thereof, are screwed into corresponding female screw holes formed in the chassis 3. One end of each of urging plates 17 is fixed on the chassis 3, and another end of the urging plate 17 supports a guide shaft 5. The urging plate 17 is formed by bending a metal plate operating as a spring substantially in the form of Z.

The height adjusting screws 16 contact the guide shaft 5 by being screwed from the surface of the chassis 3 in a state in which the lower end of each of the height adjusting screws 16 protrudes from the groove 10a of the guide shaft supporting member 10. Each of the urging plates 17 presses the guide shaft 5 against the distal end of the corresponding height adjusting screw 16.

A guide pin 14 shown in FIG. 7A is caulked on the chassis 3 and is threaded through the guide hole 4d of the bent portion 4f. Urging springs 15a and 15b, each comprising a fine-wire compressive coil spring, are inserted into lower neck portions of adjusting shoulder screws 13a and 13b, respectively.

The adjusting shoulder screw 13a compresses the urging spring 15a as the screw is advanced, until the step portion at an end of the screw portion contacts the chassis 3. As a result, the bent portion 4e of the frame 4b is always pressed against the chassis 3 by the reactive force of the compressed urging spring 15a. Accordingly, the interval between the bent portion 4e of the frame 4b and the chassis 3 is always maintained at the height of the projections 4c.

The urging spring 15b is inserted over the adjusting shoulder screw 13b at the side of the bent portion 4f, and is provided between the chassis 3 and the bent portion 4f, so as to urge the bent portion 4f to separate from the chassis 3 by its elastic reactive force.

In the second embodiment, the driving and the recording and reproducing operations of the optical pickup 1 are the same as in the first embodiment. Hence, further description thereof will be omitted, and a description will be provided of the tilt adjusting mechanism of the optical pickup 1.

To perform tilt adjustment of the optical pickup 1, first, the left-side adjusting shoulder screw 13b is rotated and, using the pair of projections 4c provided at the right of the frame 4b as a reference, the height of the frame 4b at the side of a feeding motor 4 with respect to the chassis 3 is adjusted. The inclination of the lead screw 4a in a radial direction is also adjusted by using the guide pin 14 fitted in the guide hole 4d as a guide member.

A round-bar portion located below the neck of the adjusting shoulder screw 13b, where the screw thread is not formed, is very precisely fitted in a hole formed in the bent portion 4f Accordingly, the frame 4b is very precisely positioned on the chassis 3 at two positions, i.e., this position and the position where the guide pin 14 fits in the guide hole 4d.

Next, a method for adjusting the guide shaft 5 will be described. The guide shaft 5 is supported on the chassis 3 via guide shaft supporting members 10 and urging plates 17. The height of each end of the guide shaft 5 is individually adjusted by bending the corresponding urging plate 17 by advancing or retreating/loosening a corresponding one of the height adjusting screws 16.

Accordingly, in the procedure for adjusting the tilt angle of the guide shaft 5, first, the guide shaft 5 is set to an arbitrary height by roughly adjusting the height adjusting screws 16.

Then, when mounting a unit in which the optical pickup 1 and the feeding motor 4 are integrated, the height of the right end of the frame 4b is determined by advancing the adjusting shoulder screw 13a until the step portion of the screw 13a contacts the chassis 3. The left-side adjusting shoulder screw 13b is set to an arbitrary height by performing rough adjustment.

Then, the inclination of the optical pickup 1 in a radial direction is adjusted by changing the height of the frame 4b by turning the adjusting shoulder screws 13b, using the turntable 11 of a spindle motor 8 as a reference. Then, the inclination of the optical pickup 1 in a tangential direction is adjusted so as to be parallel to the turntable 11 and at the same height as the lead screw 4a, serving as a driving guide shaft, by adjusting only the height adjusting screws 16 for the guide shaft 5.

It is thereby possible to very precisely adjust the tilt angle of the optical pickup 1. Since a reference for the adjustment and a measuring method for the tilt angle of the optical pickup 1 have no relationship with the tilt-angle adjusting mechanism of the optical-pickup feeding device of the present invention, any appropriate means may be adopted.

In the third embodiment, since a mechanism for adjusting the inclination of the frame with respect to the chassis is provided on a portion where the frame of the feeding motor mounted on the chassis is fixed on the chassis, it is possible to reduce the size of the optical-pickup driving unit by using a feeding motor 4 that is a direct drive motor in which a deceleration mechanism is omitted, and very precisely adjust the tilt angle of the optical pickup 1 with a simple configuration.

Although in the third embodiment a case is described in which the adjusting shoulder screws 13a and 13b, the urging springs 15a and 15b and the respective pairs of height adjusting screws 16 and urging plates 17 are provided at both sides, these components may be provided only at one side.

The individual components shown in outline in the drawings are all well known in the optical-pickup feeding device and optical disk apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical-pickup feeding device comprising:
    a chassis;
    a guide shaft supported on said chassis;
    a feeding motor including a main shaft having a lead screw formed thereon;
    a connecting member fitted on the lead screw;
    a frame, mounted on said chassis, for supporting the whole of said feeding motor;
    an optical pickup, on one side of which said connecting member is connected, another side of which is guided on said guide shaft, said optical pickup being driven in a direction parallel to said guide shaft and the lead screw by said feeding motor via said connecting member; and
    a meshing feed member, fixed to one of said optical pickup and said connecting member, and having a tooth in mesh engagement with a screw portion of the lead screw.

2. An optical-pickup feeding device according to claim 1, further comprising:
    a tilt adjusting unit comprising a screw member and a spring member for adjusting an interval of said optical pickup with respect to said chassis in a focusing direction, said tilt adjusting unit being disposed at least one of respective both end portions of said supporting portions with respect to said chassis, at both ends of said frame and said guide shaft in a direction parallel to said lead screw.

3. An optical-pickup feeding device according to claim 1, wherein said meshing feed member is grasped between said optical pickup and said connecting member.

4. An optical-pickup feeding device according to claim 1, wherein said meshing feed member is made of a metal spring operating as a spring.

5. An optical-pickup feeding device according to claim 1, wherein said meshing feed member is formed of a resin and integrated with said connecting member.

6. An optical disk apparatus comprising:

an optical pickup; and an optical-pickup feeding device comprising:

a chassis;

a guide shaft supported on said chassis;

a feeding motor including a main shaft having a lead screw formed thereon;

a connecting member fitted on the lead screw;

a frame, mounted on said chassis, for supporting the whole of said feeding motor;

said optical pickup, on one side of which said connecting member is connected, another side of which is guided on said guide shaft, said optical pick up being driven in a direction parallel to said guide shaft and the lead screw by said feeding motor via said connecting member; and a meshing feed member, fixed to one of said optical pickup and said said connecting member, and having a tooth in mesh engagement with a screw portion of the lead screw.

* * * * *